(12) United States Patent
Jones et al.

(10) Patent No.: US 12,341,931 B2
(45) Date of Patent: *Jun. 24, 2025

(54) METHOD AND SYSTEM FOR ACOUSTIC COMMUNICATION OF DATA

(71) Applicant: SONOS EXPERIENCE LIMITED, Hayes (GB)

(72) Inventors: Daniel John Jones, London (GB); James Andrew Nesfield, Edinburgh (GB)

(73) Assignee: Sonos Experience Limited, Hayes (GB)

( * ) Notice: Subject to any disclaimer, the term of this patent is extended or adjusted under 35 U.S.C. 154(b) by 155 days.

This patent is subject to a terminal disclaimer.

(21) Appl. No.: 18/144,395

(22) Filed: May 8, 2023

(65) Prior Publication Data

US 2024/0007566 A1    Jan. 4, 2024

Related U.S. Application Data (63) Continuation-in-part of application No. 16/342,078, filed as application No. PCT/GB2017/053113 on Oct. 13, 2017, now Pat. No. 11,683,103.

(30) Foreign Application Priority Data

Oct. 13, 2016    (GB) ........................... 1617408

(51) Int. Cl.
*H04B 11/00*    (2006.01)
*H04M 9/08*    (2006.01)
*H04R 3/02*    (2006.01)

(52) U.S. Cl.
CPC ............ *H04M 9/082* (2013.01); *H04B 11/00* (2013.01); *H04R 3/02* (2013.01)

(58) Field of Classification Search
CPC ........... H04M 9/082; H04B 11/00; H04R 3/02
See application file for complete search history.

(56) References Cited

U.S. PATENT DOCUMENTS

| | | | |
|---|---|---|---|
| 4,045,616 | A | 8/1977 | Sloane |
| 4,048,074 | A | 9/1977 | Bruenemann et al. |
| 4,088,030 | A | 5/1978 | Iversen et al. |
| 4,101,885 | A | 7/1978 | Blum |

(Continued)

FOREIGN PATENT DOCUMENTS

| | | |
|---|---|---|
| CN | 103259563 A | 8/2013 |
| CN | 105790852 A | 7/2016 |

(Continued)

OTHER PUBLICATIONS

Non-Final Office Action mailed Mar. 25, 2015, issued in connection with U.S. Appl. No. 12/926,470, filed Nov. 19, 2010, 24 pages.
Non-Final Office Action mailed Mar. 28, 2016, issued in connection with U.S. Appl. No. 12/926,470, filed Nov. 19, 2010, 26 pages.
Non-Final Office Action mailed Jan. 6, 2017, issued in connection with U.S. Appl. No. 12/926,470, filed Nov. 19, 2010, 22 pages.

(Continued)

*Primary Examiner* — Isam A Alsomiri
*Assistant Examiner* — Abdallah Abulaban
(74) *Attorney, Agent, or Firm* — Nixon & Vanderhye, P.C.

(57) ABSTRACT

The present invention relates to a method for receiving data transmitted acoustically. The method includes the steps of receiving an acoustically transmitted signal; and decoding the signal using, at least, a first plurality of voters to extract the data. The first plurality of voters comprise differing values for a first acoustic characteristic to address interference. A system and software are also disclosed.

20 Claims, 7 Drawing Sheets

(56) References Cited

U.S. PATENT DOCUMENTS

| | | |
|---|---|---|
| 4,323,881 A | 4/1982 | Mori |
| 4,794,601 A | 12/1988 | Kikuchi |
| 6,133,849 A | 10/2000 | McConnell et al. |
| 6,163,803 A | 12/2000 | Watanabe |
| 6,272,535 B1 | 8/2001 | Iwamura |
| 6,532,477 B1 | 3/2003 | Tang et al. |
| 6,711,538 B1 | 3/2004 | Omori et al. |
| 6,766,300 B1 | 7/2004 | Laroche |
| 6,798,889 B1 | 9/2004 | Dicker et al. |
| 6,909,999 B2 | 6/2005 | Thomas et al. |
| 6,996,532 B2 | 2/2006 | Thomas |
| 7,058,726 B1 | 6/2006 | Osaku et al. |
| 7,349,668 B2 | 3/2008 | Ilan et al. |
| 7,379,901 B1 | 5/2008 | Philyaw |
| 7,403,743 B2 | 7/2008 | Welch |
| 7,571,014 B1 | 8/2009 | Lambourne et al. |
| 7,944,847 B2 | 5/2011 | Trine et al. |
| 8,483,853 B1 | 7/2013 | Lambourne |
| 8,494,176 B2 | 7/2013 | Suzuki et al. |
| 8,594,340 B2 | 11/2013 | Takara et al. |
| 8,782,530 B2 | 7/2014 | Beringer et al. |
| 9,118,401 B1 | 8/2015 | Nieto et al. |
| 9,137,243 B2 | 9/2015 | Suzuki et al. |
| 9,237,226 B2 | 1/2016 | Frauenthal et al. |
| 9,270,811 B1 | 2/2016 | Atlas |
| 9,288,597 B2 | 3/2016 | Carlsson et al. |
| 9,344,802 B2 | 5/2016 | Suzuki et al. |
| 10,090,003 B2 | 10/2018 | Wang |
| 10,186,251 B1 | 1/2019 | Mohammadi |
| 10,236,006 B1 | 3/2019 | Gurijala et al. |
| 10,236,031 B1 | 3/2019 | Gurijala |
| 10,498,654 B2 | 12/2019 | Shalev et al. |
| 2002/0054608 A1 | 5/2002 | Wan et al. |
| 2002/0107596 A1 | 8/2002 | Thomas et al. |
| 2002/0152388 A1 | 10/2002 | Linnartz et al. |
| 2002/0184010 A1 | 12/2002 | Eriksson et al. |
| 2003/0065918 A1 | 4/2003 | Willey |
| 2003/0195745 A1 | 10/2003 | Zinser, Jr. et al. |
| 2003/0212549 A1 | 11/2003 | Steentra et al. |
| 2004/0002858 A1 | 1/2004 | Attias et al. |
| 2004/0081078 A1 | 4/2004 | McKnight et al. |
| 2004/0133789 A1 | 7/2004 | Gantman et al. |
| 2004/0148166 A1 | 7/2004 | Zheng |
| 2004/0264713 A1 | 12/2004 | Grzesek |
| 2005/0049732 A1 | 3/2005 | Kanevsky et al. |
| 2005/0086602 A1 | 4/2005 | Philyaw et al. |
| 2005/0219068 A1 | 10/2005 | Jones et al. |
| 2006/0167841 A1 | 7/2006 | Allan et al. |
| 2006/0253209 A1 | 11/2006 | Hersbach et al. |
| 2006/0287004 A1 | 12/2006 | Fuqua |
| 2007/0063027 A1 | 3/2007 | Belfer et al. |
| 2007/0121918 A1 | 5/2007 | Tischer |
| 2007/0144235 A1 | 6/2007 | Werner et al. |
| 2007/0174052 A1 | 7/2007 | Manjunath et al. |
| 2007/0192672 A1 | 8/2007 | Bodin et al. |
| 2007/0192675 A1 | 8/2007 | Bodin et al. |
| 2007/0232257 A1 | 10/2007 | Otani et al. |
| 2007/0268162 A1 | 11/2007 | Viss et al. |
| 2008/0002882 A1 | 1/2008 | Voloshynovskyy et al. |
| 2008/0011825 A1 | 1/2008 | Giordano et al. |
| 2008/0027722 A1 | 1/2008 | Haulick et al. |
| 2008/0031315 A1 | 2/2008 | Ramirez et al. |
| 2008/0059157 A1 | 3/2008 | Fukuda et al. |
| 2008/0112885 A1 | 5/2008 | Okunev et al. |
| 2008/0144624 A1 | 6/2008 | Marcondes et al. |
| 2008/0232603 A1 | 9/2008 | Soulodre |
| 2008/0242357 A1 | 10/2008 | White |
| 2008/0262928 A1 | 10/2008 | Michaelis |
| 2009/0034712 A1 | 2/2009 | Grasley et al. |
| 2009/0119110 A1 | 5/2009 | Oh et al. |
| 2009/0123002 A1 | 5/2009 | Karthik et al. |
| 2009/0141890 A1 | 6/2009 | Steenstra et al. |
| 2009/0175257 A1 | 7/2009 | Belmonte et al. |
| 2009/0254485 A1 | 10/2009 | Baentsch et al. |
| 2010/0030838 A1 | 2/2010 | Atsmon et al. |
| 2010/0064132 A1 | 3/2010 | Ravikiran Sureshbabu |
| 2010/0088390 A1 | 4/2010 | Bai et al. |
| 2010/0134278 A1 | 6/2010 | Srinivasan et al. |
| 2010/0146115 A1 | 6/2010 | Bezos |
| 2010/0223138 A1 | 9/2010 | Dragt |
| 2010/0267340 A1 | 10/2010 | Lee |
| 2010/0290504 A1 | 11/2010 | Torimoto et al. |
| 2010/0290641 A1 | 11/2010 | Steele |
| 2011/0173208 A1 | 7/2011 | Vogel |
| 2011/0216783 A1 | 9/2011 | Takeuchi et al. |
| 2011/0276333 A1 | 11/2011 | Wang et al. |
| 2011/0277023 A1 | 11/2011 | Meylemans et al. |
| 2011/0307787 A1 | 12/2011 | Smith |
| 2012/0045994 A1 | 2/2012 | Koh et al. |
| 2012/0075083 A1 | 3/2012 | Isaacs |
| 2012/0084131 A1 | 4/2012 | Bergel et al. |
| 2012/0214416 A1 | 8/2012 | Kent et al. |
| 2012/0214544 A1 | 8/2012 | Shivappa et al. |
| 2013/0010979 A1 | 1/2013 | Takara et al. |
| 2013/0030800 A1 | 1/2013 | Tracey et al. |
| 2013/0034243 A1 | 2/2013 | Yermeche et al. |
| 2013/0077798 A1 | 3/2013 | Otani et al. |
| 2013/0113558 A1 | 5/2013 | Pfaffinger et al. |
| 2013/0216058 A1 | 8/2013 | Furuta et al. |
| 2013/0216071 A1 | 8/2013 | Maher et al. |
| 2013/0223279 A1 | 8/2013 | Tinnakornsrisuphap et al. |
| 2013/0275126 A1 | 10/2013 | Lee |
| 2013/0331970 A1 | 12/2013 | Beckhardt et al. |
| 2014/0003625 A1 | 1/2014 | Sheen et al. |
| 2014/0028818 A1 | 1/2014 | Brockway, III et al. |
| 2014/0037107 A1 | 2/2014 | Marino, Jr. et al. |
| 2014/0046464 A1 | 2/2014 | Reimann |
| 2014/0053281 A1 | 2/2014 | Benoit et al. |
| 2014/0074469 A1 | 3/2014 | Zhidkov |
| 2014/0108020 A1 | 4/2014 | Sharma et al. |
| 2014/0142958 A1 | 5/2014 | Sharma et al. |
| 2014/0164629 A1 | 6/2014 | Barth et al. |
| 2014/0172141 A1 | 6/2014 | Mangold |
| 2014/0172429 A1 | 6/2014 | Butcher et al. |
| 2014/0258110 A1 | 9/2014 | Davis et al. |
| 2015/0004935 A1 | 1/2015 | Fu |
| 2015/0088495 A1 | 3/2015 | Jeong et al. |
| 2015/0141005 A1 | 5/2015 | Suryavanshi et al. |
| 2015/0215299 A1 | 7/2015 | Burch et al. |
| 2015/0248879 A1 | 9/2015 | Miskimen et al. |
| 2015/0271676 A1 | 9/2015 | Shin et al. |
| 2015/0349841 A1 | 12/2015 | Mani et al. |
| 2015/0371529 A1 | 12/2015 | Dolecki |
| 2015/0382198 A1 | 12/2015 | Kashef et al. |
| 2016/0007116 A1 | 1/2016 | Holman |
| 2016/0021473 A1 | 1/2016 | Riggi et al. |
| 2016/0098989 A1 | 4/2016 | Layton et al. |
| 2016/0309276 A1 | 10/2016 | Ridihalgh et al. |
| 2017/0208170 A1 | 7/2017 | Mani et al. |
| 2017/0279542 A1 | 9/2017 | Knauer et al. |
| 2018/0106897 A1 | 4/2018 | Shouldice et al. |
| 2018/0115844 A1 | 4/2018 | Lu et al. |
| 2018/0167147 A1 | 6/2018 | Almada et al. |
| 2018/0213322 A1 | 7/2018 | Napoli et al. |
| 2018/0359560 A1 | 12/2018 | Defraene et al. |
| 2019/0035719 A1 | 1/2019 | Daitoku et al. |
| 2019/0045301 A1 | 2/2019 | Family et al. |
| 2019/0096398 A1 | 3/2019 | Sereshki |
| 2019/0348041 A1 | 11/2019 | Cella et al. |
| 2020/0091963 A1 | 3/2020 | Christoph et al. |
| 2020/0105128 A1 | 4/2020 | Frank |
| 2020/0169327 A1 | 5/2020 | Lin et al. |
| 2021/0098008 A1 | 4/2021 | Nesfield et al. |

FOREIGN PATENT DOCUMENTS

| | | |
|---|---|---|
| CN | 106921650 A | 7/2017 |
| EP | 1760693 A1 | 3/2007 |
| EP | 2334111 A1 | 6/2011 |
| EP | 2916554 A1 | 9/2015 |
| EP | 3275117 A1 | 1/2018 |
| EP | 3408936 A2 | 12/2018 |
| EP | 3526912 A1 | 8/2019 |
| GB | 2369995 A | 6/2002 |

(56) References Cited

FOREIGN PATENT DOCUMENTS

| | | | |
|---|---|---|---|
| GB | 2484140 | A | 4/2012 |
| JP | H1078928 | A | 3/1998 |
| JP | 2001320337 | A | 11/2001 |
| JP | 2004512765 | A | 4/2004 |
| JP | 2004139525 | A | 5/2004 |
| JP | 2007121626 | A | 5/2007 |
| JP | 2007195105 | A | 8/2007 |
| JP | 2008219909 | A | 9/2008 |
| WO | 0016497 | A1 | 3/2000 |
| WO | 0115021 | A2 | 3/2001 |
| WO | 0150665 | A1 | 7/2001 |
| WO | 0161987 | A2 | 8/2001 |
| WO | 0163397 | A1 | 8/2001 |
| WO | 0211123 | A2 | 2/2002 |
| WO | 0235747 | A2 | 5/2002 |
| WO | 2004002103 | A1 | 12/2003 |
| WO | 2005006566 | A2 | 1/2005 |
| WO | 2008131181 | A2 | 10/2008 |
| WO | 2016094687 | A1 | 6/2016 |

OTHER PUBLICATIONS

Non-Final Office Action mailed Aug. 9, 2019, issued in connection with U.S. Appl. No. 16/012,167, filed Jun. 19, 2018, 15 pages.
Non-Final Office Action mailed on Oct. 4, 2022, issued in connection with U.S. Appl. No. 16/496,685, filed Sep. 23, 2019, 15 pages.
Non-Final Office Action mailed on Feb. 5, 2014, issued in connection with U.S. Appl. No. 12/926,470, filed Nov. 19, 2010, 22 pages.
Non-Final Office Action mailed on Jul. 1, 2022, issued in connection with U.S. Appl. No. 16/623,160, filed Dec. 16, 2019, 10 pages.
Non-Final Office Action mailed on Jul. 11, 2022, issued in connection with U.S. Appl. No. 17/660,185, filed Apr. 21, 2022, 20 pages.
Non-Final Office Action mailed on Aug. 12, 2021, issued in connection with U.S. Appl. No. 16/342,060, filed Apr. 15, 2019, 88 pages.
Non-Final Office Action mailed on Oct. 15, 2021, issued in connection with U.S. Appl. No. 16/496,685, filed Sep. 23, 2019, 12 pages.
Non-Final Office Action mailed on May 19, 2023, issued in connection with U.S. Appl. No. 16/956,905, filed Jun. 22, 2020, 20 pages.
Non-Final Office Action mailed on Jul. 21, 2022, issued in connection with U.S. Appl. No. 16/956,905, filed Jun. 22, 2020, 15 pages.
Non-Final Office Action mailed on Sep. 24, 2020, issued in connection with U.S. Appl. No. 16/012,167, filed Jun. 19, 2018, 20 pages.
Non-Final Office Action mailed on Dec. 27, 2021, issued in connection with U.S. Appl. No. 16/956,905, filed Jun. 22, 2020, 12 pages.
Non-Final Office Action mailed on Jan. 29, 2021, issued in connection with U.S. Appl. No. 16/342,060, filed Apr. 15, 2019, 59 pages.
Non-Final Office Action mailed on Feb. 5, 2021, issued in connection with U.S. Appl. No. 16/342,078, filed Apr. 15, 2019, 13 pages.
Non-Final Office Action mailed on Sep. 7, 2021, issued in connection with U.S. Appl. No. 16/623,160, filed Dec. 16, 2019, 11 pages.
Notice of Allowance mailed Mar. 15, 2018, issued in connection with U.S. Appl. No. 12/926,470, filed Nov. 19, 2010, 10 pages.
Notice of Allowance mailed Mar. 19, 2021, issued in connection with U.S. Appl. No. 16/012,167, filed Jun. 19, 2018, 9 pages.
Notice of Allowance mailed on Feb. 8, 2023, issued in connection with U.S. Appl. No. 16/623,160, filed Dec. 16, 2019, 10 pages.
Notice of Allowance mailed on Aug. 11, 2022, issued in connection with U.S. Appl. No. 16/342,078, filed Apr. 15, 2019, 15 pages.
Notice of Allowance mailed on Aug. 11, 2023, issued in connection with U.S. Appl. No. 17/883,020, filed Aug. 8, 2022, 21 pages.
Notice of Allowance mailed on Feb. 18, 2022, issued in connection with U.S. Appl. No. 16/564,766, filed Sep. 9, 2019, 8 pages.
Notice of Allowance mailed on Jan. 27, 2023, issued in connection with U.S. Appl. No. 16/496,685, filed Sep. 23, 2019, 7 pages.
Notice of Allowance mailed on Mar. 29, 2022, issued in connection with U.S. Appl. No. 16/342,060, filed Apr. 15, 2019, 24 pages.
Notice of Allowance mailed on Apr. 5, 2022, issued in connection with U.S. Appl. No. 16/956,905, filed Jun. 22, 2020, 9 pages.
Notice of Allowance mailed on Feb. 7, 2023, issued in connection with U.S. Appl. No. 16/342,078, filed Apr. 15, 2019, 12 pages.
Soriente et al., "HAPADEP: Human-Assisted Pure Audio Device Pairing*" Computer Science Department, University of California Irvine, 12 pages. [Retrieved Online] URLhttps://www.researchgate.net/publication/220905534_HAPADEP_Human-assisted_pure_audio_device_pairing.
Tarr, E.W. "Processing perceptually important temporal and spectral characteristics of speech", 2013, Available from ProQuest Dissertations and Theses Professional. Retrieved from https://dialog.proquest.com/professional/docview/1647737151?accountid=131444, 200 pages.
United Kingdom Patent Office, United Kingdom Examination Report mailed on Oct. 8, 2021, issued in connection with United Kingdom Application No. GB2113511.6, 7 pages.
United Kingdom Patent Office, United Kingdom Examination Report mailed on Jun. 11, 2021, issued in connection with United Kingdom Application No. GB1716909.5, 5 pages.
United Kingdom Patent Office, United Kingdom Examination Report mailed on Feb. 2, 2021, issued in connection with United Kingdom Application No. GB1715134.1, 5 pages.
United Kingdom Patent Office, United Kingdom Examination Report mailed on Oct. 29, 2021, issued in connection with United Kingdom Application No. GB1709583.7, 3 pages.
United Kingdom Patent Office, United Kingdom Office Action mailed on May 10, 2022, issued in connection with United Kingdom Application No. GB2202914.4, 5 pages.
United Kingdom Patent Office, United Kingdom Office Action mailed on Jan. 22, 2021, issued in connection with United Kingdom Application No. GB1906696.8, 2 pages.
United Kingdom Patent Office, United Kingdom Office Action mailed on Mar. 24, 2022, issued in connection with United Kingdom Application No. GB2202914.4, 3 pages.
United Kingdom Patent Office, United Kingdom Office Action mailed on Jan. 28, 2022, issued in connection with United Kingdom Application No. GB2113511.6, 3 pages.
United Kingdom Patent Office, United Kingdom Office Action mailed on Feb. 9, 2022, issued in connection with United Kingdom Application No. GB2117607.8, 3 pages.
United Kingdom Patent Office, United Kingdom Search Report mailed on Sep. 22, 2021, issued in connection with United Kingdom Application No. GB2109212.7, 5 pages.
Wang, Avery Li-Chun. An Industrial-Strength Audio Search Algorithm. Oct. 27, 2003, 7 pages. [online]. [retrieved on May 12, 2020] Retrieved from the Internet URL: https://www.researchgate.net/publication/220723446_An_Industrial_Strength_Audio_Search_Algorithm.
Advisory Action mailed on Mar. 1, 2022, issued in connection with U.S. Appl. No. 16/342,078, filed Apr. 15, 2019, 3 pages.
Advisory Action mailed on Aug. 19, 2022, issued in connection with U.S. Appl. No. 16/496,685, filed Sep. 23, 2019, 3 pages.
Bourguet et al. "A Robust Audio Feature Extraction Algorithm for Music Identification," AES Convention 129; Nov. 4, 2010, 7 pages.
C. Beaugeant and H. Taddei, "Quality and computation load reduction achieved by applying smart transcoding between CELP speech codecs," 2007, 2007 15th European Signal Processing Conference, pp. 1372-1376.
European Patent Office, Decision to Refuse mailed on Nov. 13, 2019, issued in connection with European Patent Application No. 11773522.5, 52 pages.
European Patent Office, European EPC Article 94.3 mailed on Oct. 8, 2021, issued in connection with European Application No. 17790809.2, 9 pages.
European Patent Office, European EPC Article 94.3 mailed on Dec. 10, 2021, issued in connection with European Application No. 18845403.7, 41 pages.
European Patent Office, European EPC Article 94.3 mailed on Oct. 12, 2021, issued in connection with European Application No. 17795004.5, 8 pages.

(56) References Cited

OTHER PUBLICATIONS

European Patent Office, European EPC Article 94.3 mailed on Oct. 25, 2022, issued in connection with European Application No. 20153173.8, 5 pages.
European Patent Office, European EPC Article 94.3 mailed on Oct. 28, 2021, issued in connection with European Application No. 18752180.2, 7 pages.
European Patent Office, European EPC Article 94.3 mailed on Jul. 6, 2022, issued in connection with European Application No. 20153173.8, 4 pages.
European Patent Office, European Extended Search Report mailed on Aug. 31, 2020, issued in connection with European Application No. 20153173.8, 8 pages.
European Patent Office, Summons to Attend Oral Proceedings mailed on Jul. 13, 2023, issued in connection with European Application No. 18752180.2, 6 pages.
European Patent Office, Summons to Attend Oral Proceedings mailed on Mar. 15, 2019, issued in connection with European Application No. 11773522.5-1217, 10 pages.
Final Office Action mailed Oct. 16, 2014, issued in connection with U.S. Appl. No. 12/926,470, filed Nov. 19, 2010, 22 pages.
Final Office Action mailed Aug. 17, 2017, issued in connection with U.S. Appl. No. 12/926,470, filed Nov. 19, 2010, 22 pages.
Final Office Action mailed Nov. 30, 2015, issued in connection with U.S. Appl. No. 12/926,470, filed Nov. 19, 2010, 25 pages.
Final Office Action mailed on Nov. 1, 2022, issued in connection with U.S. Appl. No. 16/623,160, filed Dec. 16, 2019, 10 pages.
Final Office Action mailed on May 10, 2022, issued in connection with U.S. Appl. No. 16/496,685, filed Sep. 23, 2019, 15 pages.
Final Office Action mailed on Nov. 15, 2022, issued in connection with U.S. Appl. No. 16/956,905, filed Jun. 22, 2020, 16 pages.
Final Office Action mailed on Mar. 18, 2022, issued in connection with U.S. Appl. No. 16/623,160, filed Dec. 16, 2019, 14 pages.
Final Office Action mailed on Apr. 20, 2020, issued in connection with U.S. Appl. No. 16/012,167, filed Jun. 19, 2018, 21 pages.
Gerasimov et al. "Things That Talk: Using sound for device-to-device and device-to-human communication", Feb. 2000 IBM Systems Journal 39(3.4):530-546, 18 pages. [Retrieved Online] URLhttps://www.researchgate.net/publication/224101904_Things_that_talk_Using_sound_for_device-to-device_and_device-to-human_communication.
Glover et al. "Real-time detection of musical onsets with linear prediction and sinusoidal modeling.", 2011 EURASIP Journal on Advances in Signal Processing 2011, 68, Retrieved from the Internet URL: https://doi.org/10.1186/1687-6180-2011-68, Sep. 20, 2011, 13 pages.
Gomez et al: "Distant talking robust speech recognition using late reflection components of room impulse response", Acoustics, Speech and Signal Processing, 2008. ICASSP 2008. IEEE International Conference on, IEEE, Piscataway, NJ, USA, Mar. 31, 2008, XP031251618, ISBN: 978-1-4244-1483-3, pp. 4581-4584.
Gomez et al., "Robust Speech Recognition in Reverberant Environment by Optimizing Multi-band Spectral Subtraction", 2013 IEEE International Conference on Acoustics, Speech and Signal Processing ICASSP, Jan. 1, 2008, 6 pages.
Goodrich et al., Using Audio inn Secure Device Pairing, International Journal of Security and Networks, vol. 4, No. 1.2, Jan. 1, 2009, p. 57, Inderscience Enterprises Ltd., 12 pages.
International Bureau, International Preliminary Report on Patentability and Written Opinion, mailed on Apr. 16, 2019, issued in connection with International Application No. PCT/GB2017/053112, filed on Oct. 13, 2017, 12 pages.
International Bureau, International Preliminary Report on Patentability and Written Opinion, mailed on Apr. 16, 2019, issued in connection with International Application No. PCT/GB2017/053113, filed on Oct. 13, 2017, 8 pages.
International Bureau, International Preliminary Report on Patentability and Written Opinion, mailed on Dec. 17, 2019, issued in connection with International Application No. PCT/GB2018/051645, filed on Jun. 14, 2018, 7 pages.
International Bureau, International Preliminary Report on Patentability and Written Opinion, mailed on Mar. 19, 2019, issued in connection with International Application No. PCT/GB2017/052787, filed on Sep. 19, 2017, 7 pages.
International Bureau, International Preliminary Report on Patentability and Written Opinion, mailed on Jun. 23, 2020, issued in connection with International Application No. PCT/GB2018/053733, filed on Dec. 20, 2018, 7 pages.
International Bureau, International Preliminary Report on Patentability and Written Opinion, mailed on Sep. 24, 2019, issued in connection with International Application No. PCT/GB2018/050779, filed on Mar. 23, 2018, 6 pages.
International Bureau, International Search Report and Written Opinion mailed on Apr. 11, 2019, issued in connection with International Application No. PCT/GB2018/053733, filed on Dec. 20, 2018, 10 pages.
International Bureau, International Search Report and Written Opinion mailed on Sep. 21, 2022, issued in connection with International Application No. PCT/US2022/072465, filed on May 20, 2022, 32 pages.
International Bureau, International Search Report and Written Opinion mailed on Oct. 4, 2018, issued in connection with International Application No. PCT/GB2018/051645, filed on Jun. 14, 2018, 14 pages.
International Searching Authority, International Search Report and Written Opinion mailed on Jan. 5, 2022, issued in connection with International Application No. PCT/US2021/048380, filed on Aug. 31, 2021, 15 pages.
International Searching Authority, International Search Report and Written Opinion mailed on Mar. 13, 2018, issued in connection with International Application No. PCT/GB2017/053112, filed on Oct. 13, 2017, 18 pages.
International Searching Authority, International Search Report and Written Opinion mailed on Nov. 29, 2017, in connection with International Application No. PCT/GB2017/052787, 10 pages.
International Searching Authority, International Search Report and Written Opinion mailed on Nov. 30, 2011, in connection with International Application No. PCT/GB2011/051862, 6 pages.
International Searching Authority, International Search Report mailed on Jan. 18, 2018, issued in connection with International Application No. PCT/GB2017/053113, filed on Oct. 17, 2017, 11 pages.
International Searching Authority, International Search Report mailed on Jun. 19, 2018, issued in connection with International Application No. PCT/GB2018/050779, filed on Mar. 23, 2018, 8 pages.
Japanese Patent Office, Office Action dated Jun. 23, 2015, issued in connection with JP Application No. 2013-530801, 8 pages.
Japanese Patent Office, Office Action dated Apr. 4, 2017, issued in connection with JP Application No. 2013-530801, 8 pages.
Japanese Patent Office, Office Action dated Jul. 5, 2016, issued in connection with JP Application No. 2013-530801, 8 pages.
Lopes et al. "Acoustic Modems for Ubiquitous Computing", IEEE Pervasive Computing, Mobile and Ubiquitous Systems. vol. 2, No. 3 Jul.-Sep. 2003, pp. 62-71. [Retrieved Online] URL https://www.researchgate.net/publication/3436996_Acoustic_modems_for_ubiquitous_computing.
Madhavapeddy, Anil. Audio Networking for Ubiquitous Computing, Oct. 24, 2003, 11 pages.
Madhavapeddy et al., Audio Networking: The Forgotten Wireless Technology, IEEE CS and IEEE ComSoc, Pervasive Computing, Jul.-Sep. 2005, pp. 55-60.
Madhavapeddy et al., Context-Aware Computing with Sound, University of Cambridge 2003, pp. 315-332.
Monaghan et al. "A method to enhance the use of interaural time differences for cochlear implants in reverberant environments.", published Aug. 17, 2016, Journal of the Acoustical Society of America, 140, pp. 1116-1129. Retrieved from the Internet URL: https://asa.scitation.org/doi/10.1121/1.4960572 Year: 2016, 15 pages.

METHOD AND SYSTEM FOR ACOUSTIC COMMUNICATION OF DATA

This application is a continuation of U.S. application Ser. No. 16/342,078, filed Apr. 15, 2019, which is the U.S. national phase of International Application No. PCT/GB2017/053113 filed Oct. 13, 2017 which designated the U.S. and claims priority to GB Patent Application No. 1617408.8 filed Oct. 13, 2016, the entire contents of each of which are hereby incorporated by reference.

FIELD OF INVENTION

The present invention is in the field of data communication. More particularly, but not exclusively, the present invention relates to a method and system for acoustic communication of data.

BACKGROUND

There are a number of solutions to communicating data wirelessly over a short range to and from devices. The most typical of these is WiFi. Other examples include Bluetooth and Zigbee.

An alternative solution for a short range data communication is described in U.S. patent Publication Ser. No. 12/926,470, DATA COMMUNICATION SYSTEM. This system, invented by Patrick Bergel and Anthony Steed, involves the transmission of data using an audio signal transmitted from a speaker and received by a microphone. This system involves the encoding of data, such as short-code, into a sequence of tones within the audio signal.

This acoustic communication of data provides for novel and interesting applications. However, acoustic communication of data does involve unique problems. Specifically, because the signals are transmitted acoustically, the receiver receives a signal that may include a lot of interference created by the environment in which the signal is transmitted which may, for example, be reverberation (including early/late reflections). At the point of receiving the audio, distortions caused by interference have the effect of reducing the reliable data rates due to the decoder's increased uncertainty about a signal's original specification. For example, early reflections which are coherent but delayed versions of the direct signal, usually created from an acoustic reflection from a hard surface, may make it more difficult for a decoder to confidently determine the precise start or end point of a signal feature/note. This decreases overall reliability. It is therefore preferable to reduce these effects at the receiver. Otherwise the data encoded within the signal can be difficult to accurately detect. This can result in non-communication of data in certain environments or under certain conditions within environments.

There is a desire to improve the acoustic communication of data.

It is an object of the present invention to provide a method and system for acoustic communication of data which overcomes the disadvantages of the prior art, or at least provides a useful alternative.

SUMMARY OF INVENTION

According to a first aspect of the invention there is provided a method for receiving data transmitted acoustically, including:
a) receiving an acoustically transmitted signal; and
b) decoding the signal using, at least, a first plurality of voters to extract the data;
wherein the first plurality of voters comprise differing values for a first acoustic characteristic to address interference.

The interference may be environmental interference.

The first acoustic characteristic may be one selected from the set of reverberation cancellation, timing offset, noise cancellation, and harmonics.

The environmental interference may be one or more of reverberation, reflections, echo, distortion, delay and noise.

The signal may be decoded using, at least, a second plurality of voters to extract the data, and wherein the second plurality of voters may comprise differing values for a second acoustic characteristic to address environmental interference. The second acoustic characteristic may be one selected from the set of FFT bins, timing offset, noise, and harmonics.

The first plurality of voters may be increased by one or more voters when the data cannot be successfully initially extracted.

The acoustically transmitted signal may be received at a first device. The signal may be decoded at the first device.

The first plurality of voters may further comprise differing values for a second acoustic characteristic to address environmental interference.

The signal may be decoded using, at least, a second plurality of voters, wherein the second plurality of voters may comprise differing values for an acoustic characteristic to address environmental interference.

The data may be encoded within the signal in accordance with an encoding format. The encoding format may include one or more of a header, error correction, and a payload. The error-correction may be Reed-Solomon. The encoding format may include encoding of data within the signal as a sequence of tones.

The signal may be decoded using a decoding method comprising:
Each voter reporting whether the encoding format is detected within the signal.

The decoding method may further comprise:
Using the error correction, selecting the voter which detects the least errors in the encoding format of the signal.

The decoding method may use a confidence interval for the voters.

Each of the voters may be pre-weighted.

The decoding method may further comprise:
Decoding the signal using consensus amongst the voters.

The decoding method may further comprise:
Decoding the signal using statistical information about the signal from at least some voters.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for the acoustic communication of data.

The inventors have discovered that the audio signal, when it is received, could be processed by a plurality of different decoding engines. Each engine can be configured with different assumptions about the acoustic characteristics of the environment in which the audio signal was acoustically transmitted. The outputs from engines (called voters by the inventors) can then be used to more effectively decode the signal to extract the data encoded in the signal.

Figure 1:
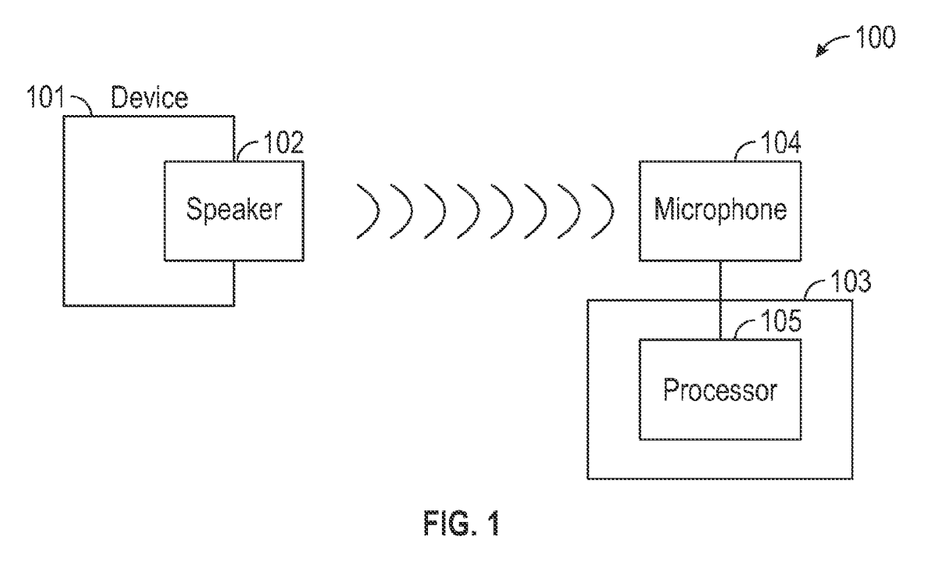
FIG. 1: shows a block diagram illustrating a system in accordance with an embodiment of the invention.

In FIG. 1, a system 100 in accordance with an embodiment of the invention is shown.

A first device is shown 101. This device 101 may include a speaker 102. The device 101 may be configured to acoustically transmit a signal, for example, via the speaker 102.

A second device 103 is shown. This second device 103 may include or be connected to a microphone 104. The microphone 104 may be configured to receive signals acoustically transmitted, for example, by the first device 101, and to forward those signals to one or more processors 105 within the second device 103.

The microphone 104 and the processor(s) 105 may be connected via a communications bus or via a wired or wireless network connection.

The processor(s) 105 may be configured to decode the received signal using a plurality of voters to extract data within the signal. The voters may be configured with differing values for an acoustic characteristic to address interference. The processor(s) 105 may be configured to perform the method described in relation to FIG. 2.

It will be appreciated by those skilled in the art that the above embodiments of the invention may be deployed on different devices and in differing architectures.

Figure 2:
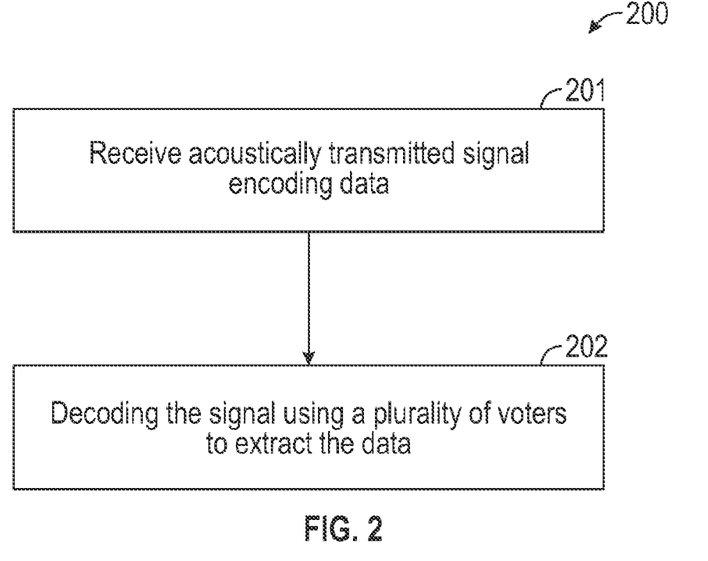
FIG. 2: shows a flow diagram illustrating a method in accordance with an embodiment of the invention.

Referring to FIG. 2, a method 200 for receiving acoustically transmitted data in accordance with an embodiment of the invention will be described.

In step 201, an acoustically transmitted signal is received (for example, via microphone 104). The signal encodes data. The data may be, for example, encoded as a sequence of tones. The encoding format of the signal may include a header, error correction and a payload, it may also include a checksum. The error correction component of the transmitted signal may be in a separate part of the transmitted signal or may be interleaved or otherwise contained within the payload section. An example of an encoding format will be described later in relation to FIG. 4. Reed-Solomon may be used as error correction as well as other forms such as Hamming or Turbo Codes, for example. At least a part of the encoding of the data and/or encoding format of the signal may be performed as described in U.S. patent Publication Ser. No. 12/926,470. The frequencies may be monophonic Frequency Shift Keying (FSK) or use a combination of frequencies to represent a data symbol similar to the DTMF encoding standard using Dual (or 'n') Tone Multiple Frequency Shift keying. The frequencies may be human audible or above the limit of human hearing (>20 kHz).

In step 202, the signal is decoded to extract data within the signal using a plurality of voters. The plurality of voters are configured within differing values for an acoustic characteristic to address interference (such as environmental interference). For example, the acoustic characteristic may be reverberation cancellation, timing offset, noise cancellation, or harmonics.

In examples where the acoustic characteristic is timing offset (e.g. where the environment creates interfering coherent, delayed versions of the direct signal), the values may be small artificial delays or advances in the relative positions of each voter with respect to the received input signal.

Figure 2A:
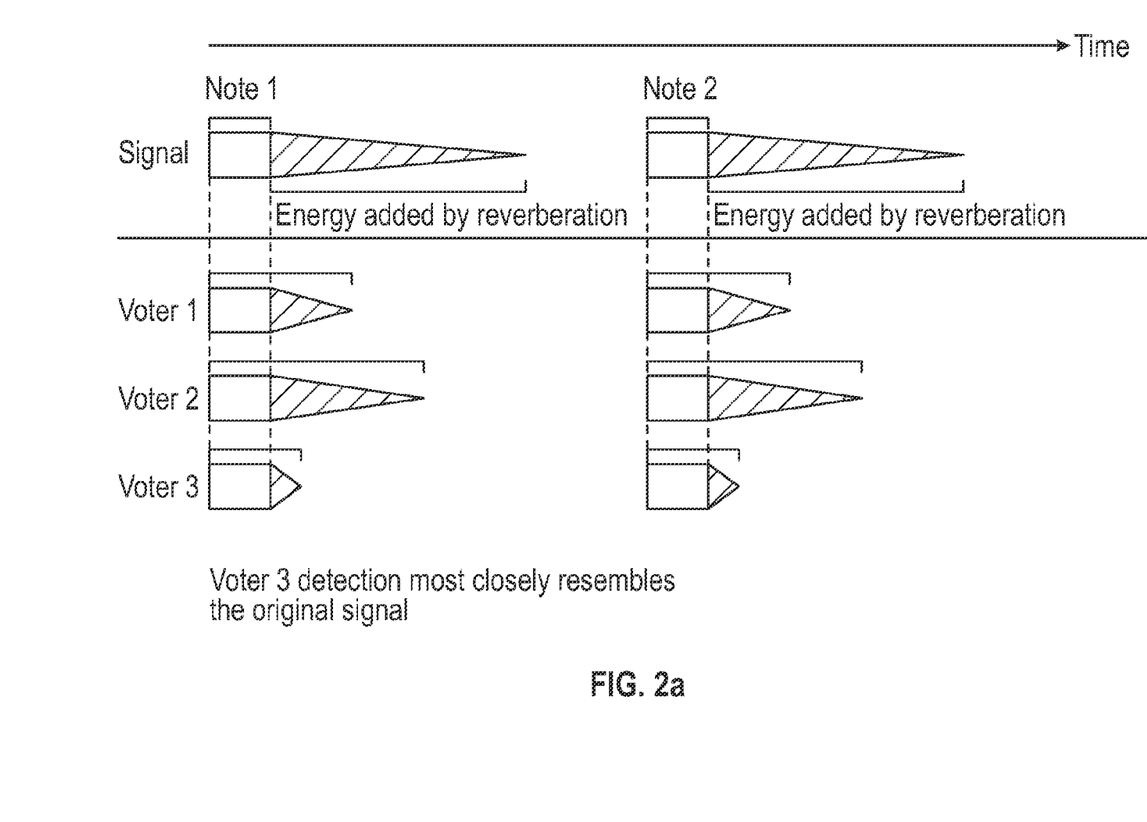
FIG. 2a: shows a diagram illustrating voters with different reverberation cancellation acoustic characteristics processing an audio signal in accordance with an embodiment of the invention.

In examples where the acoustic characteristic is reverberation cancellation (e.g. where the environment creates reverberation interference), the values may be a reverb rolloff exponent ($\alpha$) and/or a reverb cancellation magnitude ($\beta$), such that different voters will have different reverb rolloff exponent and reverb cancellation magnitude values. This is illustrated in FIG. 2a which shows voters 1, 2, and 3 with different reverberation cancellations attempting to detect a note (or tone) within a sequence of tones within the received audio signal.

The signal may be processed using a fast fourier transform (FFT) to produce bins of magnitudes across the spectrum. The FFT can be calculated on a per-frame basis. With the reverb cancellation values, the value passed to the decoder at a voter at a given frame t ($Z_t$) is a combination of the current FFT magnitude ($X_t$) and a function of previous output values ($Y_t-1$).

$$Y_t = \alpha Y_t - 1 + (1-\alpha) X_t$$

$$Z_t = X_t - \beta Y_t - 1$$

Where the reverb cancellation is characterised by two parameters:

$\alpha \in [0, 1]$: reverb rolloff exponent, which should be selected proportionally to the length of the reverb tail of the acoustic environment; Typically close to 1.

$\beta \in [0, 1]$: reverb cancellation magnitude, which determine the degree to which reverb is subtracted from the magnitude of the current spectral frame.

Figure 2B:
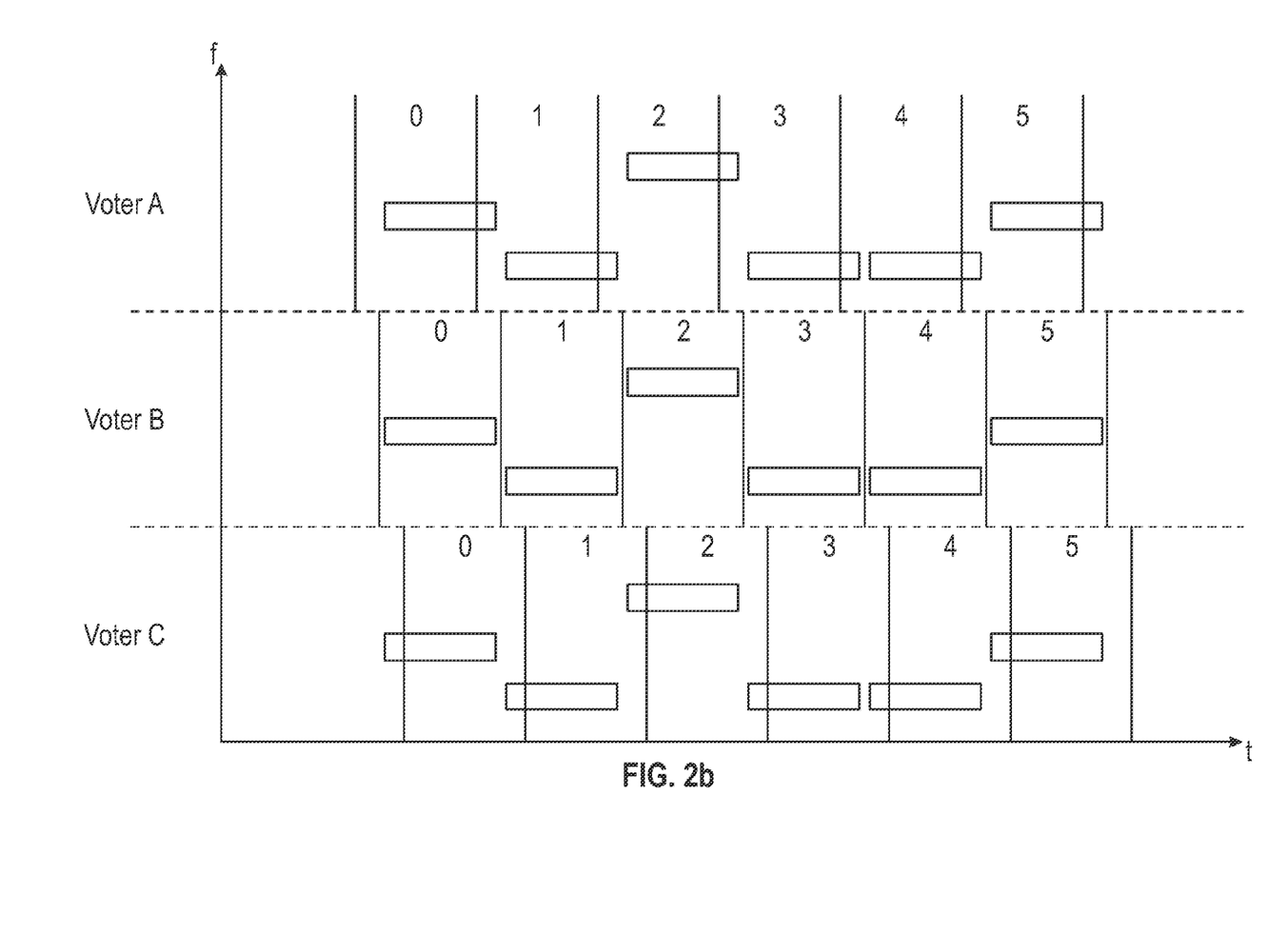
FIG. 2b: shows a diagram illustrating voters with different timing offset acoustic characteristics processing an audio signal in accordance with an embodiment of the invention.

In examples where the acoustic characteristic is timing offset (e.g. where the environment causes reflection or delay interference), the values may be offset values such that different voters will have offsets of different magnitude to accommodate different delays. This is illustrated in FIG. 2b which shows voters A, B, and C attempt to decode the same audio signal with a sequence of tones with different timing offsets.

In some embodiments, the plurality of voters may be configured with one or more further acoustic characteristics which may differ. Each of the further acoustic characteristics may be configured for addressing interference (such as environmental interference).

In some embodiments, a second plurality of voters are also used to decode the signal, this set of voters may have one or more of the same values for the acoustic characteristic as voters within the first plurality of voters, but may have a second acoustic characteristic that differs between them.

In some embodiments, one or more additional voters are added to the first set of voters when data cannot be successfully extracted.

In some embodiments, different voters may be configured to listen for a plurality of different encoding formats. These formats may be different in schema e.g. note length, definitions of 'frontdoor', payload and error correction components. These formats may also be separated by frequency, (e.g. in separate bands with one occupying a frequency range above or below the others), or with the frequencies of their notes interleaved or otherwise combined within the same total frequency range.

Furthermore, and in some embodiments, within step 202, the signal may be decoded using a decoding method where each voter reports a measure of confidence in the decoded signal. This may correspond to metrics from the acoustic space (for example, distance measures between ideal tone frequencies and analysed tone frequencies), or from the digital line coding schema (for example, minimising the number of errors corrected within Forward Error Correction, and/or using a binary measure of data integrity such as a checksum or CRC code).

The data extracted in accordance with the decoding provided by the selected voter may be identified as the data encoded within the signal. In some embodiments, a consensus method across the voters may be used to identify the data. In some embodiments, each of the voters may be pre-weighted Statistical information from at least some of the voters may be used to decode the signal to extract the data.

Figure 3A:
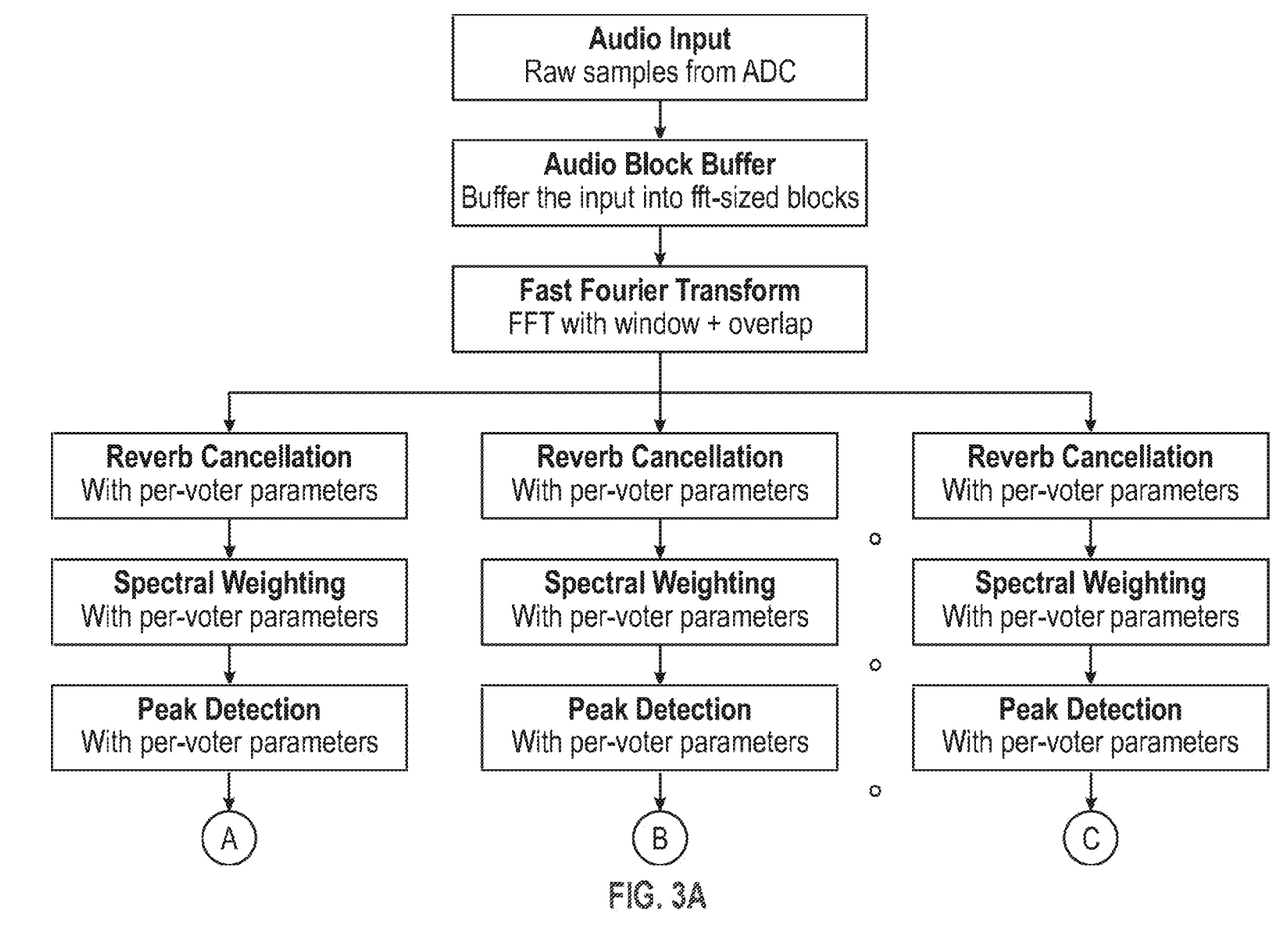
FIGS. 3A and 3B : show a flow diagram illustrating a method in accordance with an embodiment of the invention.
Figure 3B:
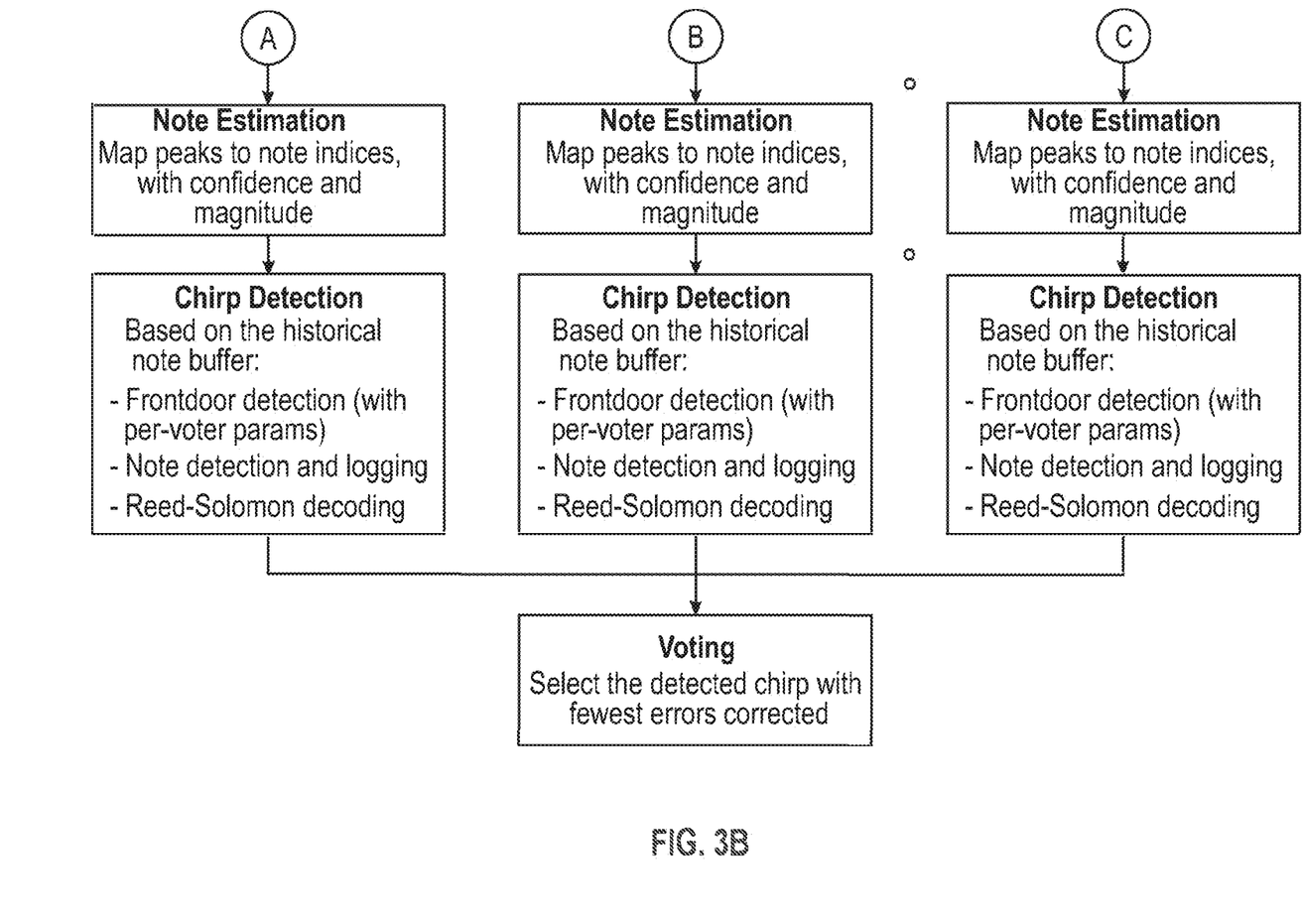

Referring to FIGS. 3A and 3B, a method and system in accordance with an embodiment of the invention will be described. In this embodiment, the audio signal will be termed a Chirp™ signal.

Voters are configured to differ with respect to their frame-offset, meaning the voters look at the timing of the signal differently from each other. This may enable the decoder as a whole to make a number of guesses regarding the actual start and end locations of each note (and the Chirp signal as a whole), thereby improving its detection accuracy by reducing the overlaps in detection between adjacent notes.

Typically the perceived timing of notes is altered due to the effects of reverb, making the addition of a de-reverberation step useful in conjunction with this timing offset.

Also the voters may apply reverb compensation differently (specifically different values of α & β as described in relation to FIG. 2)—this is particularly effective for tackling differences between different acoustic environments when where the Chirp signal is being played is not already known.

More generally, the voter characteristics may be tailored to be well suited in a variety of different acoustic conditions that decoders may face in real world scenarios. In embodiments, the voter system may not be optimised for one particular scenario, but made more robust to a very wide range of alterations caused by noise and acoustic effects during transmission.

In embodiments, this primarily is reverb cancellation, but could also include early/late reflections, room modes, echo, frequency dependent reverberation times, Doppler effects, background noise, harmonic distortion, adaptive filtering (to filter out any acoustic output of the decoding device), minimum confidence/magnitude thresholds for note detections (to have tolerant or intolerant voters), and others. Hardware characteristics could also be taken into account such as microphone and loudspeaker frequency responses.

For example, with respect to frequency dependent reverberation times each voter may have different expectations for reverberation decay rate at particular frequencies, these frequencies may correspond to frequencies that the encoder is expected to produce. The expected decay rate at each frequency then undergoes a reverberation cancellation process as described above.

It will be appreciated that different numbers of voters may be used. For example, the system may use five voters.

The number of voters may be selected based on the computation abilities of the processing device. It may also be adapted dynamically during operation based on the number of errors present during decoding. Additional voters with different parameters may be created if initial decoding with an existing voter set fails.

FIGS. 3A and 3B illustrate the application of the voters for each frame of audio.
  a) Each voter receives the output of the FFT for each frame of audio
  b) The voter applies different timing and reverb compensation to the input, and keeps its own 'history'/rolling average of its own output to be applied in the next frame.
  c) Each voter declares whether or not it thinks it has decoded a Chirp signal (based on thresholds which also vary between voters), and also how many errors it has corrected during the Reed-Solomon error correction phase. Other results besides number of errors may be used to judge the 'quality' of a decoding. These results may include the distance between expected and measured pitch of particular tones or acoustic energy of each tone. A measurement of quality may also take into account the timing and measured duration of a note at the receiver, since the timing at the sending device is known and can be compared. It will be appreciated that different parameters can be combined in this way to produce an aggregated 'confidence' parameter which in turn can be used to select a preferred voter or subset plurality of voters.
  d) If any voters have detected a Chirp signal, the voter with the least number of errors corrected, or highest confidence/quality measure, is chosen and the audio engine declares a Chirp signal having been heard.

Alternative Embodiments

The embodiments described above in relation to FIGS. 3A and 3B operate almost exclusively in the frequency domain—that is, after performing an FFT on the input signal. However, alternative embodiments may perform per-voter signal processing specifically for dereverberation as described above separately before performing the FFT and subsequent peak detection. In one example the input signal still represented in the time-domain is split into multiple channels, the number being equal to the number of voters present. Each channel is then modified using standard Finite Impulse Response, or Infinite Impulse Response filters, or standard convolution methods to modify each channel's and each subsequent voter's input signal before frequency analysis. In this embodiment, each filter is configured such that it amplifies particular frequencies present in the encoded signal. In another embodiment, each filter is configured such that it attenuates particular frequencies not present in the encoded signal. The modification to the signal before the FFT may also include gain or dynamic compression.

In some embodiments, the number and configuration of each voter can be increased and optimised based on the expected range of acoustic environments that the encoder-decoder pair will work in (i.e. for an industrial application with static, known acoustic characteristics, the number of voters can be decreased; while for a consumer mobile app expected to be taken into a wide variety of different acoustic contexts the number (and variety) of voters (and their parameter ranges) can be increased).

Figure 4:
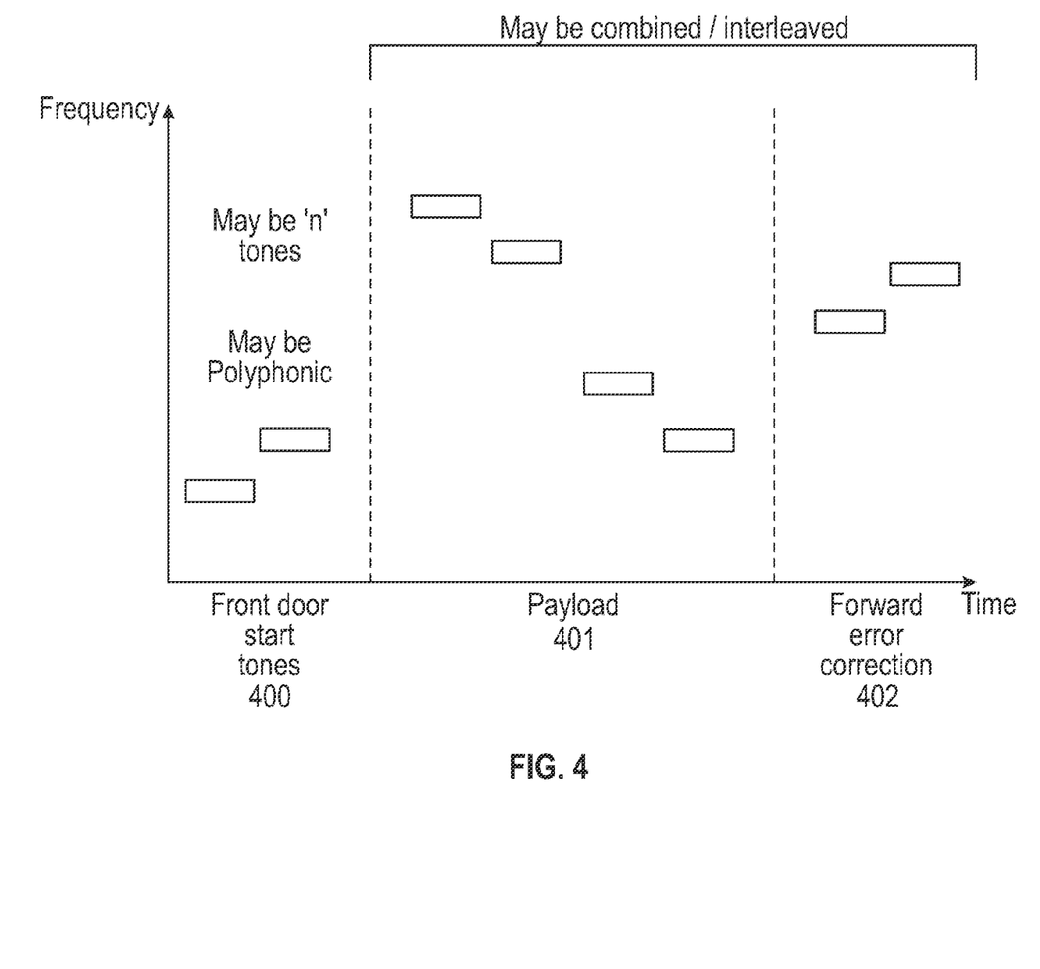
FIG. 4: shows a diagram illustrating an encoding format for an audio signal for use with a method in accordance with an embodiment of the invention.

Referring to FIG. 4, an encoding format will be described. This encoding format comprises a header 400 which includes "front door" start tones. These tones may be the same across all audio signals encoding data within the system and can assist a receiver to determine when an audio signal encodes data. The encoding format further comprises a payload 401 and forward error correction 402. It can be seen that this encoding format defines the header 400, payload 401 and forward error correction 402 as comprising a sequence of tones across a frequency spectrum. Preferably this frequency spectrum includes or comprises the human-audible frequency spectrum. The tones may be monophonic or polyphonic.

A potential advantage of some embodiments of the present invention is improved reliability of data transmission across different acoustics. For example, when an acoustic transmission solution is required to work across a range of unknown acoustic environments (e.g. train stations to living rooms), the provision of multiple voters, each responding differently increases reliability across this range. Furthermore, in some embodiments, each voter can be individually optimised for different acoustic scenarios—including extreme parameter ranges—without adversely affecting the overall voting outcome. Thus as long as the characteristics of each voter varies considerably, diminishing returns may be avoided as voters are increased (when looking across a wide range of acoustic contexts).

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. An apparatus comprising:
a microphone;
one or more processors; and
a non-transitory, computer-readable medium storing instructions that when executed by the one or more processors cause the apparatus to:
receive, via the microphone, an acoustically transmitted audio signal encoding data;
process the received acoustically transmitted audio signal to produce a particular processed signal;
decode the particular processed signal using a first plurality of voters to extract first data from the particular processed signal, wherein the first plurality of voters comprise differing values for a first acoustic characteristic to address environmental interference and the first data comprises a first encoding format;
decode the particular processed signal using a second plurality of voters to extract second data from the particular processed signal, wherein the second plurality of voters comprise differing values for a second acoustic characteristic to address environmental interference and the second data comprises a second encoding format;
apply error correction to the first encoding format and the second encoding format;
determine that the first encoding format has the fewest errors compared to the second encoding format; and
based on determining that the first encoding format has the fewest errors, select the first data extracted using the first plurality of voters.

2. The apparatus of claim 1, wherein decoding the particular processed signal using the first plurality of voters to extract first data from the particular processed signal comprises:
decoding the particular processed signal using a first voter of the first plurality of voters to extract third data; and
decoding the particular processed signal using a second voter of the first plurality of voters to extract fourth data.

3. The apparatus of claim 2, wherein the non-transitory, computer-readable medium stores further instructions that when executed by the one or more processors cause the apparatus to:
determine the third data is associated a highest confidence measure; and
based on the determination that the third data is associated with the highest confidence measure, select the third data extracted using the first voter.

4. The apparatus of claim 2, wherein the first acoustic characteristic comprises reverberation cancellation, and wherein the first voter and the second voter have different reverb rolloff exponent parameter values or reverb cancellation magnitude parameter values.

5. The apparatus of claim 1, wherein the particular processed signal comprises a plurality of audio frames, and wherein decoding the particular processed signal using the first plurality of voters to extract first data from the particular processed signal comprises:
decoding each audio frame of the plurality of audio frames using a first voter of the first plurality of voters; and
decoding each audio frame of the plurality of audio frames using a second voter of the first plurality of voters.

6. The apparatus of claim 1, wherein the first acoustic characteristic comprises reverberation cancellation, and wherein the second acoustic characteristic comprises timing offset.

7. The apparatus of claim 1, wherein the first encoding format comprises a header, error correction, and a payload, and wherein determining that the first encoding format has the fewest errors further comprises:
based on the error correction, determining that the first encoding format has the fewest errors.

8. A non-transitory computer readable medium configured for storing computer-readable instructions that, when executed on one or more processors, cause one or more processors to:
receive, via a microphone, an acoustically transmitted audio signal encoding data;
process the received acoustically transmitted audio signal to produce a particular processed signal;
decode the particular processed signal using a first plurality of voters to extract first data from the particular processed signal, wherein the first plurality of voters comprise differing values for a first acoustic characteristic to address environmental interference and the first data comprises a first encoding format;

decode the particular processed signal using a second plurality of voters to extract second data from the particular processed signal, wherein the second plurality of voters comprise differing values for a second acoustic characteristic to address environmental interference and the second data comprises a second encoding format;

apply error correction to the first encoding format and the second encoding format;

determine that the first encoding format has the fewest errors compared to the second encoding format; and based on determining that the first encoding format has the fewest errors, select the first data extracted using the first plurality of voters.

9. The non-transitory computer readable medium of claim 8, wherein decoding the particular processed signal using the first plurality of voters to extract first data from the particular processed signal comprises:

decoding the particular processed signal using a first voter of the first plurality of voters to extract third data; and decoding the particular processed signal using a second voter of the first plurality of voters to extract fourth data.

10. The non-transitory computer readable medium of claim 9, wherein the non-transitory computer readable medium stores further instructions that when executed by the one or more processors cause the one or more processors to:

determine the third data is associated with a highest confidence measure; and based on the determination that the third data is associated with the highest confidence measure, select the third data extracted using the first voter.

11. The non-transitory computer readable medium of claim 9, wherein the first acoustic characteristic comprises reverberation cancellation, and wherein the first voter and the second voter have different reverb rolloff exponent parameter values or reverb cancellation magnitude parameter values.

12. The non-transitory computer readable medium of claim 8, wherein the particular processed signal comprises a plurality of audio frames, and wherein decoding the particular processed signal using the first plurality of voters to extract first data from the particular processed signal comprises:

decoding each audio frame of the plurality of audio frames using a first voter of the first plurality of voters; and decoding each audio frame of the plurality of audio frames using a second voter of the first plurality of voters.

13. The non-transitory computer readable medium of claim 8, wherein the first acoustic characteristic comprises reverberation cancellation, and wherein the second acoustic characteristic comprises timing offset.

14. The non-transitory computer readable medium of claim 8, wherein the first encoding format comprises a header, error correction, and a payload, and wherein determining that the first encoding format has the fewest errors further comprises:

based on the error correction, determining that the first encoding format has the fewest errors.

15. A method comprising:

receiving, a microphone, an acoustically transmitted audio signal encoding data;

processing the received acoustically transmitted audio signal to produce a particular processed signal;

decoding the particular processed signal using a first plurality of voters to extract first data from the particular processed signal, wherein the first plurality of voters comprise differing values for a first acoustic characteristic to address environmental interference and the first data comprises a first encoding format;

decoding the particular processed signal using a second plurality of voters to extract second data from the particular processed signal, wherein the second plurality of voters comprise differing values for a second acoustic characteristic to address environmental interference and the second data comprises a second encoding format;

applying error correction to the first encoding format and the second encoding format;

determining that the first encoding format has the fewest errors compared to the second encoding format; and based on determining that the first encoding format has the fewest errors, selecting the first data extracted using the first plurality of voters.

16. The method of claim 15, wherein decode the particular processed signal using the first plurality of voters to extract first data from the particular processed signal comprises:

decoding the particular processed signal using a first voter of the first plurality of voters to extract third data; and decoding the particular processed signal using a second voter of the first plurality of voters to extract fourth data.

17. The method of claim 16, further comprising:

determining the third data is associated with a highest confidence measure; and based on the determination that the third data is associated with the highest confidence measure, selecting the third data extracted using the first voter.

18. The method of claim 16, wherein the first acoustic characteristic comprises reverberation cancellation, and wherein the first voter and the second voter have different reverb rolloff exponent parameter values or reverb cancellation magnitude parameter values.

19. The method of claim 15, wherein the particular processed signal comprises a plurality of audio frames, and wherein decode the particular processed signal using the first plurality of voters to extract first data from the particular processed signal comprises:

decoding each audio frame of the plurality of audio frames using a first voter of the plurality of voters; and decoding each audio frame of the plurality of audio frames using a second voter of the first plurality of voters.

20. The method of claim 15, wherein the first acoustic characteristic comprises reverberation cancellation, and wherein the second acoustic characteristic comprises timing offset.

* * * * *